Aug. 2, 1960      L. A. M. PHELAN      2,947,155
AUTOMATIC FEED FOR ICE CREAM AND THE LIKE FREEZERS
Filed March 6, 1956      2 Sheets-Sheet 1
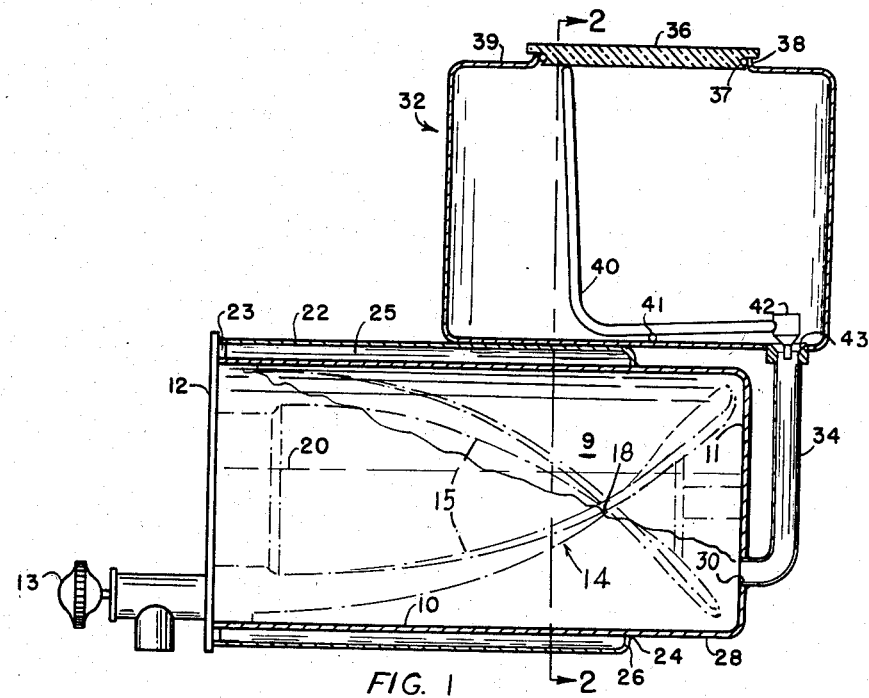
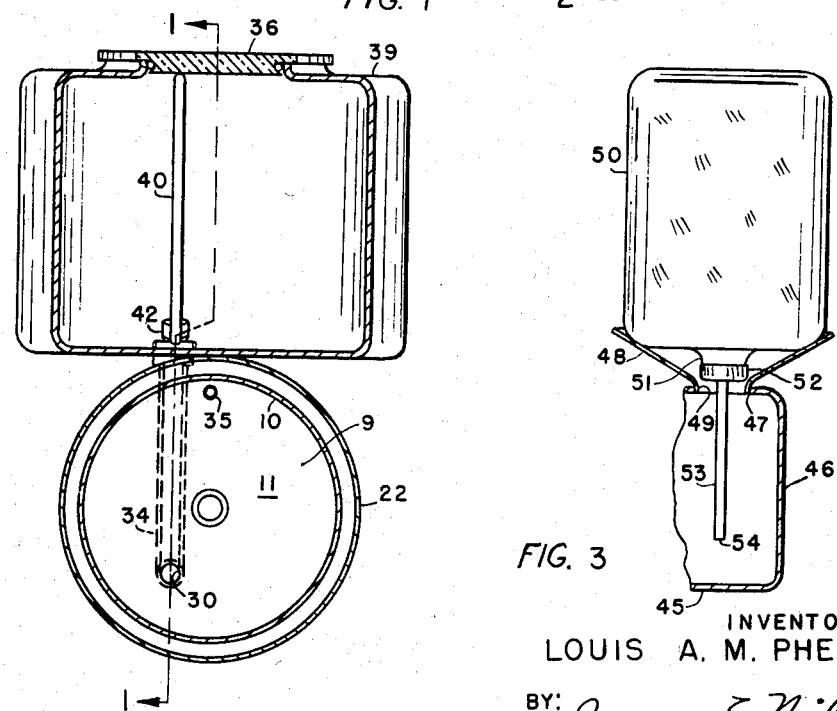
INVENTOR.
LOUIS A. M. PHELAN
BY: *James E. Nilles*
ATTORNEY Aug. 2, 1960 L. A. M. PHELAN 2,947,155
AUTOMATIC FEED FOR ICE CREAM AND THE LIKE FREEZERS
Filed March 6, 1956 2 Sheets-Sheet 2

INVENTOR.
LOUIS A. M. PHELAN
BY:
James E. Nilles
ATTORNEY

United States Patent Office 2,947,155
Patented Aug. 2, 1960

2,947,155

AUTOMATIC FEED FOR ICE CREAM AND THE LIKE FREEZERS

Louis A. M. Phelan, Rockton, Ill.

Filed Mar. 6, 1956, Ser. No. 569,769

3 Claims. (Cl. 62—342)

This invention relates to freezing mechanisms for ice cream, custards and similar material, of the type in which the mix is fed into a freezing chamber at one end, thoroughly aerated and simultaneously fed to the other end of the chamber where it is discharged as an edible frozen product. More particularly, the invention is directed to an automatic feed device for supplying the freezing chamber with fresh mix.

This is a continuation-in-part of my co-pending application Serial Number 276,553, filed March 19, 1952, now abandoned.

An object of this invention is to provide a continuous freezing machine having a completely automatic gravity fresh-mix feed mechanism requiring no valve or float metering mechanisms.

It is another object of the invention to provide a freezing machine with a freezing chamber having a portion which is not enclosed by the refrigerating means and into which portion the mix and air are introduced. The invention contemplates gravity feed for the mix which is automatically controlled by the level of the mix in the chamber and without requiring metering valve or float mechanisms.

It is still another object of the invention to provide a continuous freezing machine having a fresh mix feeding means which automatically restricts the flow of mix without the use of valve or float devices and in accordance with the minimum level of the material in the freezing chamber.

Other objects and advantages of this invention will become more apparent from the following detailed description and attached sheets of drawings wherein a form of the invention is illustrated. Accordingly, the present invention may be considered as comprising the various, constructions, combinations, or sub-combinations of parts as is hereinafter more fully set forth in the detailed description and in the claims, reference being had to the accompanying drawings in which:

Figure 1 is a side elevational view, partially in section, with certain parts removed for the sake of clarity, and showing the conveyor in phantom, the view taken on line 1—1 of Figure 2, of a freezer embodying the invention.

Figure 2 is a front elevational sectional view, taken on line 2—2 of Figure 1.

Figure 3 illustrates a modification of the device shown in Figure 1.

Figure 4:
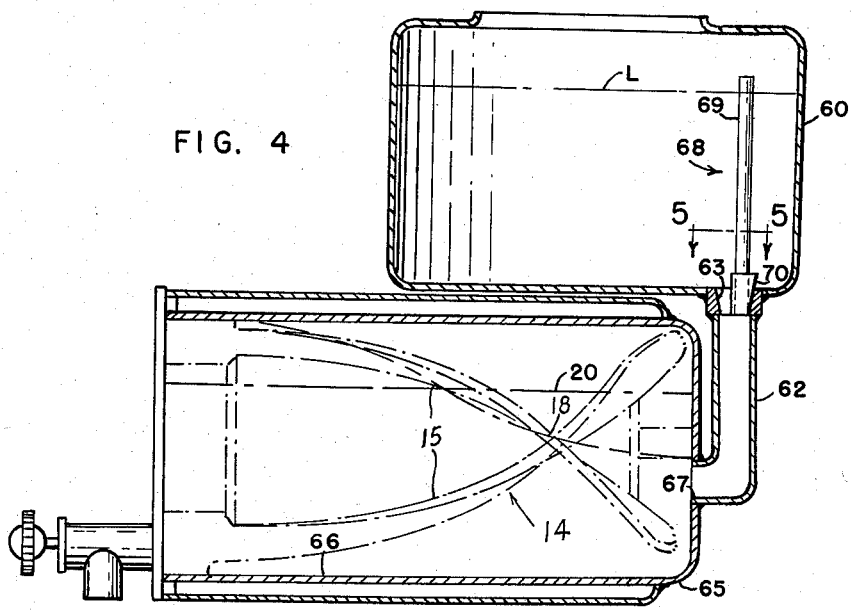
Figure 4 is a view similar to Figure 1 but illustrating a further modification.

Referring more particularly to Figures 1 and 2, the freezing chamber 9 is formed by an inner cylinder 10 having a rear end wall closure 11 made integral therewith. A removable front lid or cover 12 is secured to the front end of the cylinder in any conventional manner so as to permit periodic cleaning of the chamber. A manually operated serving valve 13 is secured adjacent the bottom of cover 12 for dispensing the frozen product. A conventional and well known conveyor unit 14 is rotatably mounted within the chamber and acts to scrape the inner surface of cylinder 10, and thoroughly agitates and aerates the mix. As the conveyor unit beats air into the mix, it also conveys the material, by means of the helical screw or auger portions 15 in an axial direction toward the front end of the chamber. The action of the conveyor unit is such as to cause the material in the chamber to assume a position indicated generally by line 18, the level of the material at the rear end of the chamber being considerably lower than at the front end. When the conveyor unit is inoperative, the material assumes the position designated generally by line 20.

While the mix is passing through the chamber and being aerated, i.e., "beaten," it is gradually frozen by refrigerating means which surround the chamber. This refrigerating means takes the form, for illustrative purposes, of a second cylinder 22 which surrounds the inner cylinder 10 and is secured thereto at 23 and 24. An annular chamber 25 is thus formed through which a refrigerant is caused to pass in the well known manner. It should be noted that in this embodiment of the invention, the refrigerating means extends from the front end of the chamber rearwardly and terminates at 26 which is spaced a distance from the rear end wall 11. Thus an unrefrigerated portion 28 of the freezing chamber is formed. The material located in this portion of the chamber remains substantially in a liquid state and the fresh mix is introduced into the chamber at this portion. The inlet 30 for the fresh mix, because of its location in this portion, is prevented from freezing shut and the flow of mix therethrough is assured. It will be understood, of course, that the unrefrigerated portion of the chamber is held at a cold temperature but it will be somewhat warmer than that part of the freezing chamber which is surrounded by the refrigerating means. The length or extent of the unrefrigerated portion will depend on the freezing temperature of the finished product for which the freezer has been designed. For instance, a custard will freeze in the general range of between 17 to 20 degrees Fahrenheit and a "shake base" will freeze at approximately 27 degrees Fahrenheit. Therefore, the device shown in Figure 1 has been found suitable for use with materials such as a shake base having a relatively high freezing temperature. That is to say, a larger unrefrigerated portion must be provided to insure that the material does not freeze immediately upon entering the chamber thus causing the inlet to be frozen shut. In practice it has been found possible to make the refrigerating means coextensive with the inner cylinder, or substantially so, depending on the freezing temperature of the product. Such an arrangement would be used for freezers which were designed for materials having a relatively low freezing temperature, such as custards. In any event, it is important to keep the areas immediately around the mix inlet and air supply inlet open. Otherwise, the delicate balanced condition between the gravity flow and the flow resistance in the supply system would be upset, as will more fully appear.

A fresh mix container 32 is supported above the freezing chamber and has a conduit 34 placing it in communication with the portion 28 of chamber 9 through inlet 30. A lid 36, which may be transparent, has an airtight sealing gasket 37 which is adapted to fit within the flange 38. Flange 38 defines an opening in the top wall 39 of container 32.

The degree of aeration of the product depends on the type of product being made. Some products have a very high volume percentage of air beaten into them and an unlimited supply of air is required for the process. The device of Figures 1 and 2 are of this type and means are therefore provided for placing the chamber in communication with the atmosphere and thereby maintaining the air in the chamber substantially at atmospheric pressure. This air inlet means comprises an opening 35 (Fig. 2) extending through the rear wall 11 and located above the level of the material in the chamber. By means of this air inlet the chamber 9 is able to "breath" an unlimited amount of air.

In order to replenish the supply of mix in container 32 before the container is empty, means are provided for closing conduit 34 when the lid 36 is removed. This means takes the form of an L-shaped member 40 pivoted on the support 41 and having a valve 42 on one of its ends which is adapted to contact valve seat 43 by gravity when the lid 36 is removed. However, when the lid is placed in position it contacts the upper end of member 40 and pivots it about support 41 thus holding valve 42 off of seat 43 and in no manner affects automatic feed. It is provided to give the attendant ample time to fill the container 32 without flooding the chamber 9 as will become more apparent.

The position of the material which is maintained in the chamber, when the conveyor unit is in operation, is approximated by line 18. The mix inlet 30 is located at a predetermined minimum height of the material in the chamber. The desired height of this top surface of the material will depend on the air content desired in the finished product. For example, if a large volume of air is desired in the product, the inlet will be located nearer the bottom of the cylinder so that a greater air space is provided above the surface of the material and the air can be readily beaten into the product. Experience has indicated that best results are obtained when the mix inlet is located somewhere below the center height of the freezing chamber. The coefficient of viscosity of the mix is relatively high in comparison, for instance, with that of water. Therefore, when sufficient resistance is offered to the flow, such as when the inlet 30 is covered by material in the chamber and a slight vacuum is formed in the supply container, further flow will no longer occur.

Referring to the modification of the invention shown in Fig. 3, the rear end of the freezing chamber 45 is also unrefrigerated and has a closed end wall 46. An opening 47 is provided on the top side of chamber 45 and has a funnel-shaped supporting member 48 surrounding said opening. More particularly, flange 49 of the member 48 extends into opening 47. A fresh-mix container 50 in the form of a jug-shaped transparent member is positioned on the funnel member. Container 50 is merely set on funnel 48 and air is able to pass freely therebetween. Thus the freezing chamber in this modification also is open to the atmosphere and able to "breath" an unlimited amount of air. This air inlet is also located in the portion of the chamber that contains no refrigerating means and thus freezing shut of the inlet is precluded. The mix container 50 has a small screw-threaded neck 51 adapted to be threadably engaged by the cap 52 to form a liquid tight joint. A tube or conduit 53 is provided in cap 52 and extends into the freezing chamber and has its discharge end 54 terminating adjacent the freezer bottom and at the desired minimum material level in the freezer. As in the case of the embodiment of Figures 1 and 2, the level of this discharge end of the fresh-mix conduit determines the minimum height of the material in the freezer chamber.

In the embodiments of the invention shown in Figures 1 to 3 inclusive, the fresh mixture conduit discharges into the freezing chamber at the minimum predetermined level of the mixture in the chamber. The freezing chamber is open to the atmosphere and able to "breath" freely. The fresh mixture containers are air tight thus capable of having a vacuum therein. Therefore when enough material has been dispensed through serving valve 13 to lower the level of the material sufficiently, the fresh mix inlet is uncovered and air is permitted to pass upwardly therethrough into the fresh-mix container and relieve the vacuum. The resistance to the flow of material has been removed and mix then flows through the conduits into the freezing chamber until the mix inlet is again covered, preventing further flow.

Figure 5:
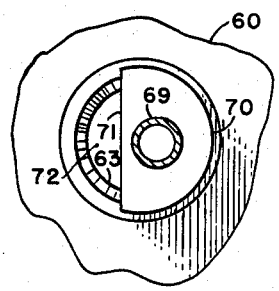
Figure 5 is a fragmentary sectional view, on an enlarged scale, taken on line 5—5 of Figure 4.

In the modification of the invention shown in Figures 4 and 5, the fresh-mix container 60 is open to atmospheric pressure although, of course, it may have a cover. It is "unsealed" in that it is incapable of furnishing a vacuum to help resist flow. A fresh-mix conduit 62 is in registry with the circular opening 63 in the bottom of container 60, and places the container in communication with the unrefrigerated portion 65 of cylinder 66 through the mix inlet 67. Cylinder 66 is otherwise closed against the admission of air, and the only air entering this cylinder is through intake member 68 and occurs after the latter has been drained of mix as follows. Opening 63 is formed on a downwardly converging taper and provides a seat for an air intake member 68. Member 68 is comprised of a tube 69 which terminates above the level L of the mix in the container. On the discharge end of tube 69 is secured a tapered plug 70 which sets snugly in the tapered opening 63. Member 68 is removable for cleaning purposes by simply lifting it from the tapered opening 63. The plug is cut away so as to have a flat surface 71 and thus does not entirely fill the opening 63. A restricted passageway 72 is thus formed between surface 71 and opening 63 through which the mix must pass. By locating the air intake member adjacent the restricted opening a balanced operating condition is established between the mix flow and air flow. The freezing chamber receives its air through conduit 62 and air intake member 68, when mix is flowing through opening 63 and down conduit 62. This flow occurs whenever the head in the feeding arrangement overbalances the head in the freezing cylinder. The height of the level of the mix in the cylinder at which this flow will occur may coincide with the mix inlet 67. The flowing movement of the mix downwardly through conduit 62 causes air to be sucked through intake member 68 and the mix and air flow together through conduit 62. More particularly, the velocity of the mix passing through the restricted opening has a Venturi effect and draws air through the member 68. When the level in the chamber has risen past the inlet 67, and the pressure in the freezing cylinder is great enough to balance the head of the mix in the supply tank the flow ceases and the conduit remains full of mix. It will be noted that both conduit 62 and air intake member 68 form the air inlet means in this modification. In this case a smaller percentage of air is desired in the finished product and therefore only a limited amount of air is supplied to the chamber.

In this elected form, liquid will flow from the supply container into the freezing chamber until it builds up a superatmospheric pressure which, taken with the head above the inlet port will balance the higher head from the supply container down to the inlet port augmented by atmospheric pressure.

*Summary*

In each of the modifications of the invention, an automatic gravity feed mechanism is provided having a fresh-mix conduit supplying mix to the chamber at the minimum mix level and at a location where it will not freeze shut. The mechanism also provides an air supply and a resistance to the flow of mix material which prevents such flow if sufficient material is in the freezing chamber and the pressure at the cylinder inlet opening is balanced with the pressure exerted by the head of the mix in the feed conduit above this opening. When the material in the chamber reaches the minimum level, enough of this resistance is removed to cause flow to commence automatically and to continue only long enough to again establish equilibrium conditions in the system.

It will now be appreciated that material is fed completely automatically by gravity without the necessity of valves or float mechanisms, into the freezing chamber at approximately the same rate that it is dispensed by the serving valve and when the material level reaches a predetermined minimum. This rate may be fast or slow and the serving may be intermittent or continuous. In any event the mix is fed at a corresponding rate and never in "batches." A uniform product as to both aeration and degree of freezing is thus assured. A freezer which is simple in operation is provided as well as one having a minimum number of parts, which results in economy of manufacture and ease of maintenance and cleaning.

It should be understood that it is not intended to limit the invention to the above described forms and details, and that the invention includes such other forms and modifications as are embraced by the scope of the appended claims.

I claim:
1. A continuous, automatic gravity feed freezer for ice cream and the like, including a horizontally disposed, refrigerated cylinder having an outer front cover with a serving valve adjacent the bottom thereof and also having a rear end wall, a conveyor unit journaled for rotation within said cylinder for moving the contents of said cylinder toward said front cover and into a mass inclined generally downwardly from front to rear, a fresh mix container supported above said cylinder, automatic gravity feed means for mix including a feed conduit extending from said fresh mix container to said cylinder and entering said cylinder through an opening adjacent said rear end wall thereof at a predetermined point spaced downwardly from the top of said cylinder, said opening being at least partially below the center height of the freezer chamber, said feed conduit and opening being unrefrigerated whereby freezing of the fresh mix therein will be prevented, means for supplying replacement air to said cylinder, and means for supporting a higher air pressure in said cylinder than in said fresh mix container, said feed means maintaining an air pocket in said cylinder above said inclined mass and automatically admitting additional mix in replacement amounts at such time as the pressure in the cylinder at said opening is not balanced with the pressure exerted by the head of the mix in the feed conduit above the fresh mix opening when frozen mix is drawn off at the serving valve.

2. A continuous, automatic gravity feed freezer for ice cream and the like, including an horizontally disposed, refrigerated cylinder having an outer front cover with a serving valve adjacent the bottom thereof and also having a rear end wall, a conveyor unit journaled for rotation within said cylinder for moving the contents of said cylinder toward said front cover and into a mass inclined generally downwardly from front to rear, a fresh mix container supported above said cylinder, automatic gravity feed means for mix including a feed conduit extending from said fresh mix container to said cylinder and entering said cylinder through an opening in the rear end wall thereof at a predetermined point below the longitudinal axis of said cylinder, said feed conduit and opening being exposed to room temperatures whereby freezing of the fresh mix therein will be prevented, means for supplying replacement air to said cylinder, and means for supporting a higher air pressure in said cylinder than in said fresh mix container, said feed means maintaining an air pocket in said cylinder above said inclined mass and automatically admitting additional mix in replacement amounts at such time as the pressure in the cylinder at said opening is not balanced with the pressure exerted by the head of the mix in the feed conduit above the fresh mix opening when frozen mix is drawn off at the serving valve.

3. A continuous, automatic gravity feed freezer for ice cream and the like, including an horizontally disposed, air sealed refrigerated cylinder having an outer front cover with a serving valve adjacent the bottom thereof and also having a rear end wall, a conveyor unit journaled for rotation within said cylinder for moving the contents of said cylinder toward said front cover and into a mass inclined generally downwardly from front to rear, a fresh mix container supported above said cylinder, said container being open to atmospheric pressure, automatic gravity feed means for mix including a feed conduit extending from the bottom of said fresh mix container to said cylinder and entering said cylinder through an opening adjacent the rear end wall thereof at a predetermined point spaced downwardly a substantial distance from the top of said cylinder to insure an adequate air supply pocket for the desired degree of overrun required for the product, said feed conduit and opening being exposed to room temperatures whereby freezing of the fresh mix therein will be prevented, a non-shiftable, fixed, air intake supply member in communication with the feed conduit and extending upwardly above the mix level in the container, said member provided with a continuously open passageway adjacent the bottom of the fresh mix container to thereby place the container in constant communication with the freezer cylinder, said feed means maintaining an air pocket in said cylinder above said inclined mass and automatically admitting additional mix in replacement amounts at such time as the pressure in the cylinder at said opening is not balanced with the pressure exerted by the head of the mix in the feed conduit above the fresh mix opening when frozen mix is drawn off at the serving valve.

References Cited in the file of this patent
UNITED STATES PATENTS

| | | |
|---|---|---|
| 1,351,302 | Sanna | Aug. 31, 1920 |
| 1,721,469 | Pfouts | July 16, 1929 |
| 1,783,864 | Vogt | Dec. 2, 1930 |
| 1,993,130 | Ballew | Mar. 5, 1935 |
| 2,059,485 | Payne | Nov. 3, 1936 |
| 2,288,067 | Boileau | June 30, 1942 |
| 2,411,081 | Carothers | Nov. 12, 1946 |
| 2,515,722 | Maranz | July 18, 1950 |
| 2,535,462 | Stoelting | Dec. 26, 1950 |
| 2,538,716 | Wakeman | Jan. 16, 1951 |
| 2,587,127 | Erickson | Feb. 26, 1952 |
| 2,610,478 | Lofstedt | Sept. 16, 1952 |
| 2,698,163 | Swenson | Dec. 28, 1954 |
| 2,737,024 | Swenson | Mar. 6, 1956 |
| 2,740,264 | Thompson | Apr. 3, 1956 |